United States Patent [19]

McLellan

[11] 4,051,543
[45] Sept. 27, 1977

[54] OVER VOLTAGE PROTECTOR USING CURRENT MONITORING

[76] Inventor: Norvel Jeff McLellan, 1002 N. Main St., Pleasanton, Tex. 78064

[21] Appl. No.: 648,010

[22] Filed: Jan. 12, 1976

[51] Int. Cl.$^2$ ............................................. H02H 9/04
[52] U.S. Cl. .................................... 361/18; 323/22 T; 323/22 Z; 323/62
[58] Field of Search ............ 307/237; 317/31, 33 VR; 323/8, 17, 22 T, 22 Z, 45, 62; 361/18

[56] References Cited

U.S. PATENT DOCUMENTS

| | | | |
|---|---|---|---|
| 3,076,925 | 2/1963 | Jackson | 323/24 X |
| 3,259,768 | 7/1966 | Burr | 310/177 X |
| 3,626,249 | 12/1971 | Snedeker | 317/31 X |

FOREIGN PATENT DOCUMENTS 1,264,541  2/1972  United Kingdom ................ 323/62

Primary Examiner—A. D. Pellinen
Attorney, Agent, or Firm—Gunn & Lee

[57] ABSTRACT

The invention is an over voltage protector for A.C. power. A single transistor is connected through a diode bridge to one line of the input power. The other side of the bridge network is connected through an output transformer to a common input and output. The base of the transistor is connected to a voltage source which may be provided by either a rectified input signal or a constantly charged capacitor located between the base and the emitter. A Zener diode connected through a diode bridge to the secondary winding of the output transformer is also connected across the base to an emitter. The breakdown voltage of the Zener diode controls the maximum voltage between the base to emitter, which consequently controls the A.C. output voltage.

7 Claims, 4 Drawing Figures

OVER VOLTAGE PROTECTOR USING CURRENT MONITORING

BACKGROUND OF THE INVENTION

The invention relates to an over voltage protector circuit and, more particularly, to an over voltage protector circuit using current monitoring to prevent alternating voltages in excess of a predetermined level.

The present over voltage protector circuit is an improvement over U.S. Pat. application Ser. No. 582,280 filed on May 30, 1975, now U.S. Pat. No. 3,980,931 by the same inventor.

BRIEF DESCRIPTION OF THE PRIOR ART

A description of the prior art was contained in previously mentioned U.S. Pat. application Ser. No. 582,280 which is hereby incorporated by reference.

The present invention is a more economically designed over voltage protector circuit than the incorporated reference because the present invention does not require the matching of transistors which control the output voltage. Further description of the prior art is unnecessary in light of the description contained in the incorporated reference.

SUMMARY OF THE INVENTION

It is an object of the present invention to provide an over voltage protector circuit for alternating voltages.

It is another object of the present invention to provide an inexpensive solid state circuit which has common household use to prevent excess consumption of power by household appliances due to over voltages supplied by utility companies, not to mention damage to the appliances.

It is yet another object of the present invention to provide an economic over voltage protector circuit wherein a single transistor connects through a diode bridge to an output transformer. The bias voltage for the single transistor may be supplied either through an input transformer having a rectifier bridge network or through a capacitor that charges during one-half of the input cycle. If the bias voltage on the transistor exceeds a predetermined level as measured by a secondary winding of the output transformer feeding through a bridge network to a Zener diode, the Zener diode will breakdown and will begin to conduct thereby maintaining a maximum bias of the transistor. The maximum bias of the transistor will prevent a further increase in output voltage as developed across the output tranformer.

It is even another object of the present invention to provide a limiting device across the transistor to prevent a large input voltages from causing a breakdown of the transistor. Such a limiting device may be either a gas tube, saturable reactor or a Zener diode.

These and other objects of the invention, as may be contained in the incorporated reference, may be accomplished by the present invention as is more specifically set forth in the following detailed description.

DESCRIPTION OF THE PREFERRED EMBODIMENT

Figure 1:
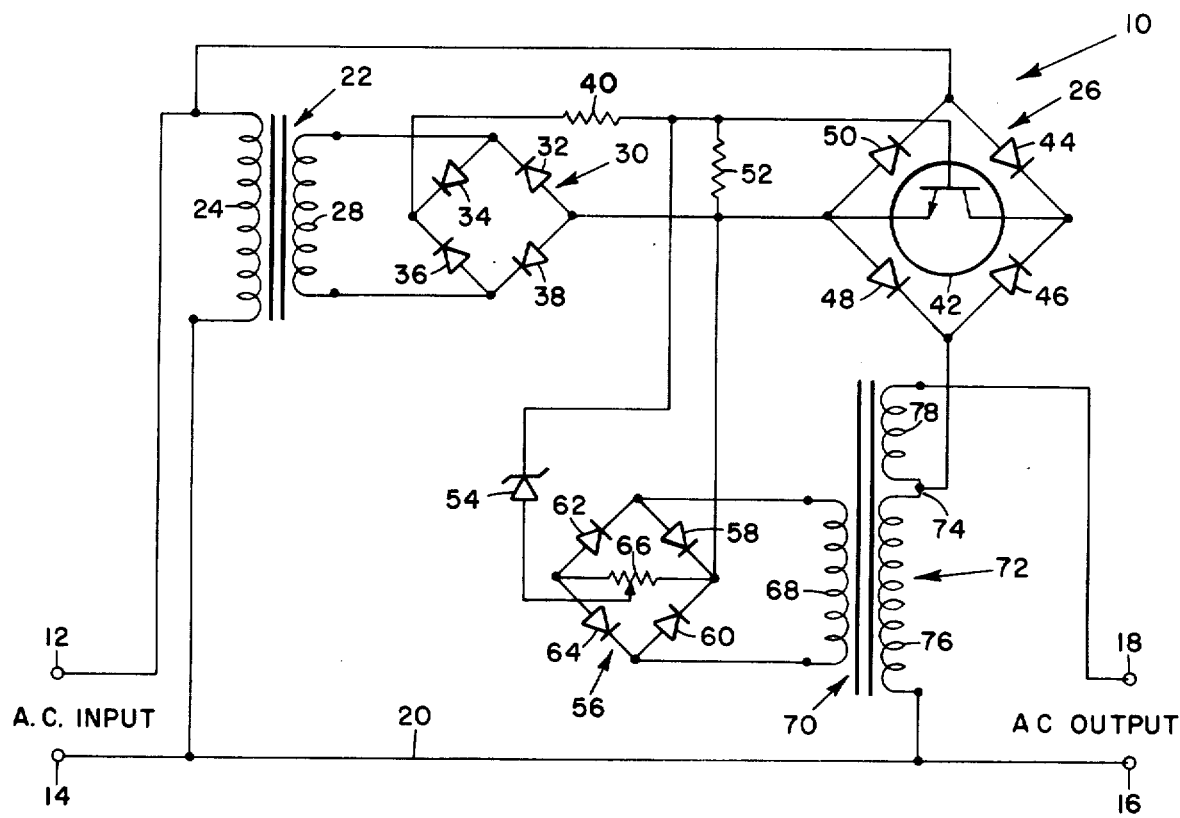
FIG. 1 is an electrical schematic of the over voltage protector.

Referring now to FIG. 1 of the drawings, there is shown an over voltage protector represented generally by reference numeral 10. An A.C. input is fed into input terminals 12 and 14 with the input terminal 14 connecting directly to output terminal 16. The other output terminal 18 connects to the over voltage protector 10 in the manner described hereinafter. The normal A.C. input being fed into input terminals 12 and 14 is the standard line voltage being supplied by a public utility at approximately 60 cycles per second and normally between the ranges of 110 to 130 volts rms. For the purposes of this patent application, the base line of the schematic which connects input terminal 14 and output terminal 16 shall be referred to as reference ground 20. Reference ground 20 is not connected to an actual ground as is the case for the center lead of three conductor 110 volt supplies.

The A.C. input connects across input transformer 22 by connecting to primary winding 24. Input terminal 12 also connects to a diode bridge circuit represented generally by reference numeral 26. The primary winding 24 receives the full A.C. input by connecting between input terminals 12 and 14.

A secondary winding 28 is connected to a diode bridge 30 formed by diodes 32, 34, 36 and 38. The input transformer 22, which gives a 24 volt A.C. output per 110 volts A.C. input, supplies A.C. voltage to the diode bridge 30. One side of the output from the diode bridge 30 feeds through resistor 40 to the base of transistor 42. The other side of the diode bridge 30 connects to the emitter of transistor 42 as well as diode bridge circuit 26.

Transistor 42 is connected across diode bridge circuit 26 formed by diodes 44, 46, 48 and 50. Transistor 42 being of the NPN type requires a positive bias on the base with respect to the emitter before the transistor 42 will conduct. Since diode bridge 30 rectifies the A.C. input received from the secondary winding 28, a positive bias is applied to the base of transistor 42 during each half cycle. This bias voltage is developed across resistor 52.

Also connected across resistor 52 to control the bias of transistor 42 is Zener diode 54. The Zener diode 54 receives its voltage from diode bridge 56 composed of diodes 58, 60, 62 and 64. Across the diode bridge 56 is located variable resistor 66 with the wiper arm being connected to the anode of Zener diode 54. The cathode of Zener diode 54 is connected to the base of transistor 42.

Voltage for the diode bridge 56 is supplied by a secondary winding 68 of output transformer 70. The primary winding 72 of output transformer 70 is connected to output terminals 16 and 18. A center tap 74 is connected to the primary winding 72 so that coil 76 has approximately ten turns for each turn of coil 78.

Assume now that the positive half cycle of the A.C. input is feeding through input terminal 12 to input transformer 22 and diode bridge circuit 26. A current will flow through the primary winding 24 of input transformer 22 thereby creating a voltage across the secondary winding 28. The voltage from the secondary winding 28 will feed through diodes 34 and 38 of diode bridge 30 and resistor 40 to the base of transistor 42 to provide a positive bias voltage. Simultaneously, current will flow through diode 44 and into the collector and out the emitter of transistor 42, through diode 48 and coil 76 to reference ground 20. The flow of the current through the primary winding 72 will provide an output voltage across output terminals 16 and 18.

Likewise, if the voltage through input terminal 12 is in the negative half cycle, the current will flow through diodes 32 and 36 of diode bridge 30 to develop a positive bias for the base of transistor 42 by flowing through resistor 52. Also, current will flow through coil 76, diode 46 through the collector and the emitter of transistor 42, and diode 50 to input terminal 12. The flow of current through the primary winding 72 of the output transformer 70 will generate a negative voltage output.

Figure 4:
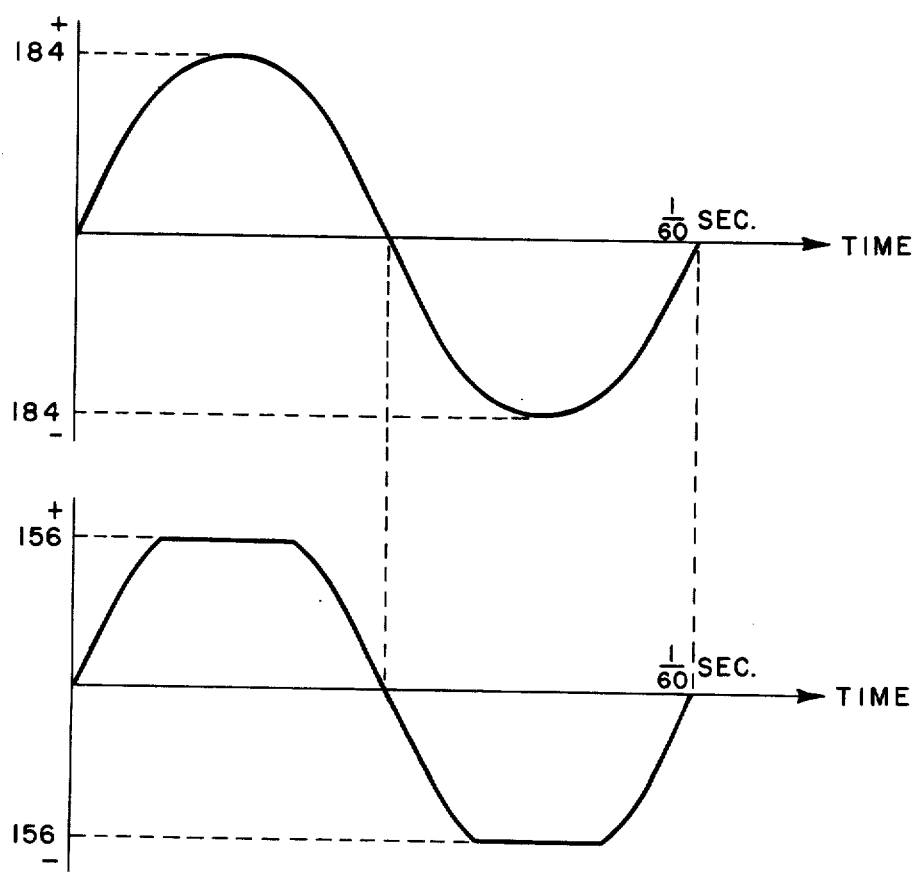
FIG. 4 is an input and output waveform plotted against time, the output waveform being limited by the present invention.

Assume now that the rms value of the A.C. input exceeds a preset level with 110 volts being used as a representative example of a preset level. Flow of current through the primary winding 72 of output transformer 70 will be reflected by a voltage across secondary winding 68. The voltage developed across secondary winding 68 feeds directly to diode bridge 56. By current flow through diodes 60 and 62, or diodes 58 and 64, a voltage will be developed across variable resistor 66. Variable resistor 66 and Zener diode 54 are connected in parallel with bias resistor 52. Variable resistor 66 is very small with respect to resistor 52 and is merely used for fine tuning purposes. Therefore, if the voltage across bias resistor 52 exceeds a predetermined level, Zener diode 54 will begin to conduct thereby preventing a further increase in bias voltage to transistor 42. However, until the A.C. input exceeds 110 volts, Zener diode 54 will never conduct or have any effect on the other voltage protector 10. The variable resistor 66 allows the set point of Zener 54 to be varied within certain limits. This would likewise vary the peak-to-peak A.C. output voltage. This can be more easily seen in FIG. 4 wherein the peak-to-peak A.C. input voltage is 184 volts. Once the peak voltage for any cycle reaches 156 volts, the Zener diode 54 begins to conduct to prevent a further increase in bias voltage of transistor 42 and, consequently, a subsequent increase in current through the primary winding 72 of output transformer 70 is prevented. Once the voltage drops below 156 volts peak-to-peak, conduction of the Zener diode 54 will stop. The 156 volts peak-to-peak corresponds to approximately 110 volts rms.

The reason for the center tap of the primary winding 72 of output transformer 70 is to provide a stepup in output voltage in case of under voltage conditions, such as brownouts that commonly occur during peak consumption hours. At the same time regulation is provided by the over voltage protector circuit 10 to prevent an excess of voltage beyond a predetermined level. This gives the consumer the best of both worlds in that his voltage is stepped up during low voltage or peak consumption periods, and decreased during maximum voltage or minimum consumption periods.

Figure 2:
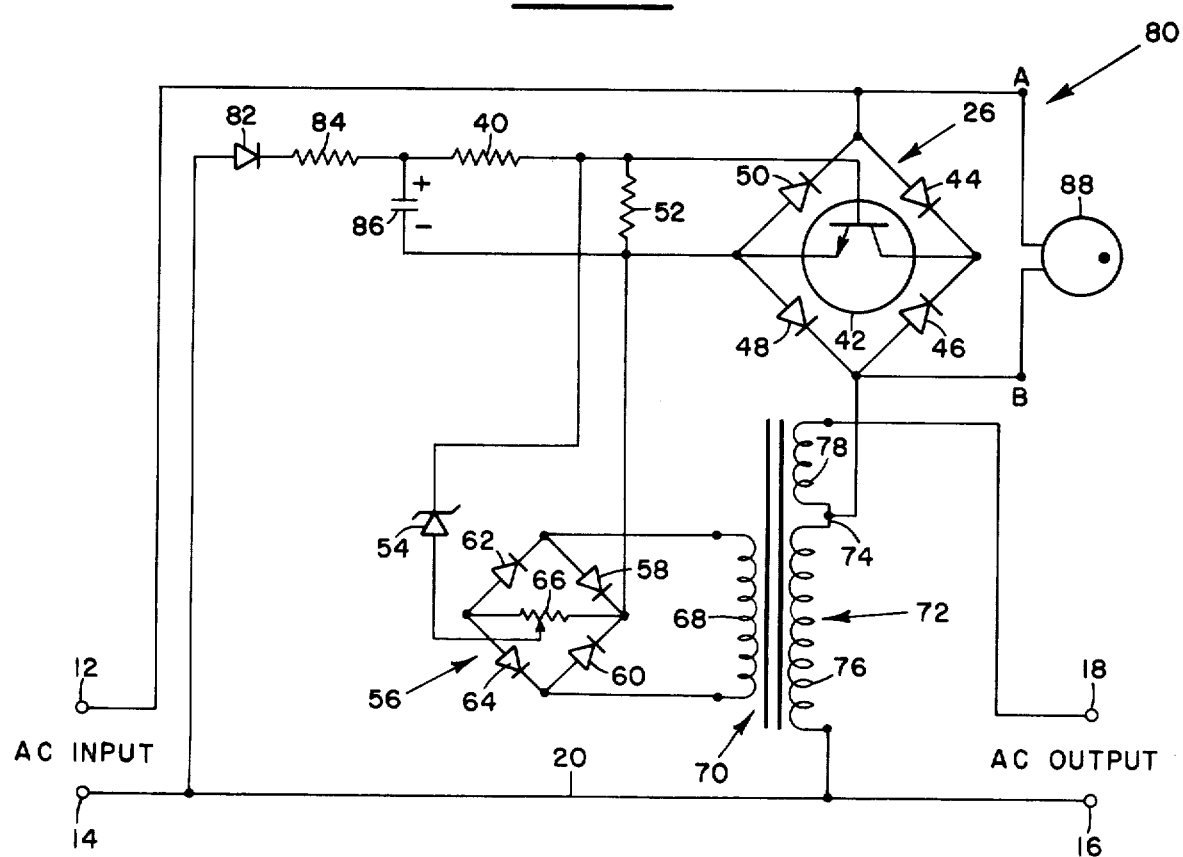
FIG. 2 is an electrical schematic of a first alternative embodiment of the over voltage protector.

Referring now to FIG. 2 of the drawings, there is shown an alternative embodiment represented generally by the reference numeral 80. Like numerals have been used to designate like components in FIG. 2 as were previously discussed in conjunction with FIG. 1. The variations between the over voltage protector 80 shown in FIG. 2 and the over voltage protector 10 shown in FIG. 1 is in the bias voltage of transistor 42. During the negative half cycle for the A.C. input, a current will flow through diode 82, resistor 84, capacitor 86 and diode 50 to the input terminal 12. The flow of current through capacitor 86 will cause a voltage charge to develop thereacross as indicated in the drawing. The voltage charge is reflected across resistor 52 as a forward bias voltage for transistor 42 which causes transistor 40 to conduct. The capacitor 86 and resistor 40 are of sufficient size to maintain a charge across capacitor 86 during the positive half cycle thereby maintaining a positive bias on transistor 42.

The operation of the Zener diode 54 is the same as before except now the Zener diode 54 prevents a voltage across resistor 52, which is the bias for transistor 42, in excess of a predetermined level. The charge on capacitor 86 provides the bias voltage on transistor 42. Therefore, by controlling the voltage across resistor 52 with Zener diode 54, the bias of transistor 42 is controlled. Additional voltage in capacitor 86 is dropped across resistor 40. In a normal application Zener diode 54 will be set to conduct at approximately 30 volts.

If the A.C. input voltage was exceedingly high, especially during the charge of capacitor 86, the transistor 42 would have a tendency to breakdown and allow current flow therethrough. This is commonly called the "punch through" voltage that could damage a particular transistor. To prevent punch through voltage of transistor 42, a protector device may be connected between terminals A and B. In FIG. 2, the protective device designated by reference numeral 88 is a gas tube. When voltage across the gas tube exceeds a predetermined level, it will begin to conduct, thereby preventing a further increase in voltage across transistor 42. This would prevent the punch through voltage of transistor 42 which could damage the transistor.

Another protective device that could be used in place of the gas tube 88 is a saturable reactor which would allow current flow therethrough if voltage exceeded a predetermined level.

Figure 3:
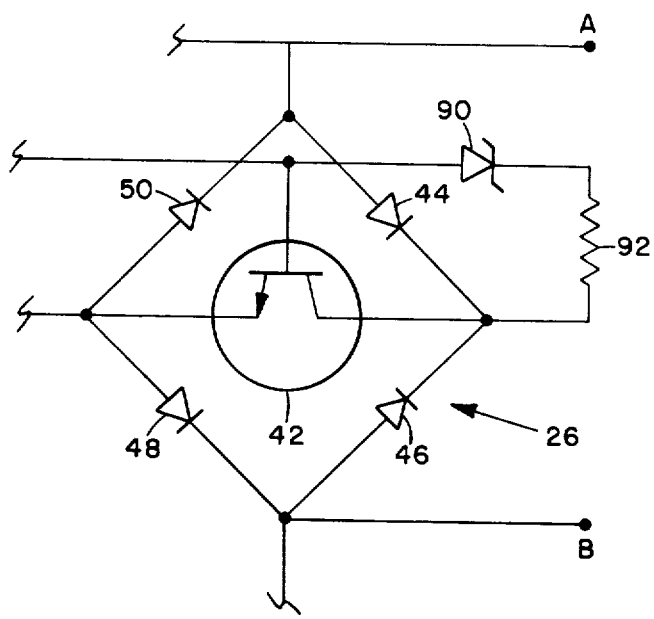
FIG. 3 is a partial electrical schematic illustrating a means for replacing the gas tube by a Zener diode which will prevent a breakdown of the transistor.

Referring now to FIG. 3, there is a third alternative to the gas tube or saturable reactor. FIG. 3 is a partial schematic of the circuit previously shown in FIG. 2 with the like components being designated by like numerals. The protective device 88 connected between terminals A and B has been removed. Now a Zener diode 90 connects in series with a limiting resistor 92 to prevent an excess of voltage being developed between the collector and base to transistor 42. This configuration prevents punch through voltage being developed across transistor 42, thereby preventing damage in case of high input voltage or voltage spikes.

While transistor 42 has been shown as a single transistor, it should be realized that it may be a Darlington configuration wherein two transistors are contained inside of a single transistor housing which has the effect of acting as a single high gain transistor.

The practical way of setting the voltage regulators shown in FIGS. 1 and 2 would be to connect the regulator to an A.C. input that exceeds the desired rms voltage. The variable resistor 66 may then be adjusted to varying the voltage developed across Zener diode 54 and, consequently, set a maximum bias voltage for transistor 42. A maximum bias voltage for transistor 42 would in turn set a maximum peak voltage on the A.C. output and, consequently, a maximum rms voltage.

I claim:

1. An over voltage regulator for alternating voltages to prevent an output voltage exceeding a predetermined peak voltage, said regulator comprising:
    first diode bridge connected to one of two input terminals;

transistor means connected across said first diode bridge for current flow therethrough;

an output transformer having a primary and secondary winding, said primary winding being connected on one side thereof to a common input and output terminal and towards the other side of said primary winding to said first diode bridge;

means for biasing said transistor means in response to an A.C. input, said biasing means being connected between a base of said transistor means and one side of said first diode bridge;

first rectifying means connected to said secondary winding for rectifying voltages received therefrom;

Zener diode means connected to said rectifying means, said Zener means also being connected in parallel with said biasing means, said Zener diode means conducting to prevent a further increase in bias voltage when said output voltage reaches said predetermined peak voltage.

2. The over voltage protector as recited in claim 1 wherein said first rectifying means includes a second diode bridge connected to said secondary winding, said Zener diode connecting via a wiper arm of a potentiometer to opposite terminals of said second diode bridge, said potentiometer setting said predetermined peak voltage.

3. The over voltage protector as recited in claim 2 further including a protective device connected across said first diode bridge, said protective device conducting if voltage across said transistor means approximately reaches its maximum rating to prevent damage to said transistor means.

4. The over voltage protector as recited in claim 1 wherein said biasing means includes an input transformer having a first and second winding, said first winding being connected across said input terminals, said second winding being connected to a second rectifying means, output from said second rectifying means being connected to said base of said transistor means.

5. The over voltage protector as recited in claim 5 wherein said second rectifying means is a third diode bridge, voltage from said third diode bridge being developed across a bias resistor for said transistor means.

6. The over voltage protector as recited in claim 1 wherein said biasing means includes a biasing diode connected to one of said input terminals and to a biasing capacitor, said biasing capacitor charging during one half cycle and maintaining charge during the next half cycle.

7. The over voltage protector as recited in claim 6 wherein said biasing means further includes a biasing resistor in parallel with said biasing capacitor, maximum charge on said capacitor being determined by conduction of said Zener diode means connected across said biasing resistor and biasing capacitor.

* * * * *